United States Patent
Tsau et al.

(10) Patent No.: US 10,161,734 B2
(45) Date of Patent: Dec. 25, 2018

(54) MEASUREMENT FIXTURE FOR MEASURING DIMENSIONS OF A BLADE SERVER

(71) Applicants: Inventec (Pudong) Technology Corp., Shanghai (CN); Inventec Corporation, Taipei (TW)

(72) Inventors: Shiang-Chun Tsau, Taipei (TW); Ying-Chao Peng, Taipei (TW); Chun-Ying Yang, Taipei (TW)

(73) Assignees: Inventec (Pudong) Technology Corp., Shanghai (CN); Inventec Corporation, Taipei (TW)

( * ) Notice: Subject to any disclaimer, the term of this patent is extended or adjusted under 35 U.S.C. 154(b) by 128 days.

(21) Appl. No.: 15/470,939

(22) Filed: Mar. 28, 2017

(65) Prior Publication Data
US 2018/0135957 A1 May 17, 2018

(30) Foreign Application Priority Data

Nov. 16, 2016 (CN) .......................... 2016 1 1030695

(51) Int. Cl.
*G01B 5/02* (2006.01)
*G01B 3/14* (2006.01)
*G01B 5/00* (2006.01)

(52) U.S. Cl.
CPC ................. *G01B 5/02* (2013.01); *G01B 3/14* (2013.01); *G01B 5/0004* (2013.01)

(58) Field of Classification Search
CPC ........... G01B 3/14; G01B 5/0004; G01B 5/02
USPC ......................................................... 33/552
See application file for complete search history.

(56) References Cited

U.S. PATENT DOCUMENTS

| | | | | |
|---|---|---|---|---|
| 4,509,265 A * | 4/1985 | Donaldson | ............... | B23Q 3/18 |
| | | | | 250/559.22 |
| 7,024,787 B2 * | 4/2006 | Varsell | ...................... | G01B 3/14 |
| | | | | 33/547 |
| 7,640,670 B2 * | 1/2010 | Zhang | ...................... | G01B 3/14 |
| | | | | 33/1 BB |
| 8,714,036 B2 * | 5/2014 | Zhang | .................. | H05K 7/1488 |
| | | | | 73/866.4 |
| 9,494,406 B1 * | 11/2016 | Daley | ....................... | G01B 5/14 |
| 2009/0151183 A1 * | 6/2009 | Zhang | ...................... | G01B 3/14 |
| | | | | 33/613 |
| 2018/0135957 A1 * | 5/2018 | Tsau | ......................... | G01B 5/02 |

* cited by examiner

*Primary Examiner* — Yaritza Guadalupe
(74) *Attorney, Agent, or Firm* — Winston Hsu

(57) ABSTRACT

A measurement fixture includes a base, a lateral plate, a top plate, a movable measurement plate and a dimensional measurement component. The lateral plate has a piercing hole and a plurality of guiding pillars. The base and the top plate are respectively disposed on opposite sides of the lateral plate. The movable measurement plate utilizes a plurality of guiding holes to movably connect with the plurality of guiding pillars. The movable measurement plate includes an opening portion and an indicating portion adjacent by the opening portion. The dimensional measurement component movably passes through the piercing hole. A first end of the dimensional measurement component protrudes from a surface of the lateral plate facing a blade server to touch the blade server, and a second end of the dimensional measurement component protrudes from the other opposite surface of the lateral plate to partly protrude from the opening portion.

10 Claims, 8 Drawing Sheets

MEASUREMENT FIXTURE FOR MEASURING DIMENSIONS OF A BLADE SERVER

BACKGROUND OF THE INVENTION

1. Field of the Invention

The present invention relates to a measurement fixture, and more particularly, to a measurement fixture for measuring dimensions of any kind of blade servers.

2. Description of the Prior Art

A blade cabinet can accommodate a plurality of blade server nodes, modularized network nodes are disposed on a rear of the blade cabinet, disk array modules is installed inside the blade cabinet, so that the blade cabinet can be represented as a small multi-function data center. Further, possessive space of the blade cabinet is economical than the ordinary data center, and the blade cabinet has features of high operation efficiency and great operation density. Node dimensions of the blade server can be designed as full-height, half-height and quarter-height, which depends on actual demand, and electronic components of the blade server are designed in accordance with different node dimensions of the blade server. Because a size of the blade cabinet is invariable, full dimensions of each node is an important issue for normal use of the blade server while the server node is inserted into the blade cabinet.

A plurality of connectors can be disposed on the rear end of the blade server. An amount, position and dimensions of the connector are designed according to standards of the blade server, which means the rear of each blade server may have specific appearance dimensions. For measuring entire appearance of the blade server, such as a distance between the front end of the blade server and the connector reaching out the rear end of the blade server, conventional skill is applied to put the blade server in the laboratory to execute dimension measurement by specific measurement instruments (such as the three dimensional coordinate measuring apparatus and/or the height gauge), and the foresaid conventional skill results in complicated operation and spends instrument queue time and instrument adjustment time.

SUMMARY OF THE INVENTION

The present invention provides a measurement fixture for measuring dimensions of any kind of blade servers for solving above drawbacks.

According to the claimed invention, a measurement fixture for measuring dimensions of a blade server includes a base, a lateral plate, a top plate, a movable measurement plate and a dimensional measurement component. The lateral plate stands upon the base, a piercing hole is formed on the lateral plate, and a plurality of guiding pillars is disposed on the lateral plate. The top plate is disposed on an edge of the lateral plate opposite to the base, an accommodating space is formed between the base, the lateral plate and the top plate and configured to accommodate the blade server. A plurality of guiding holes is formed on the movable measurement plate, and the movable measurement plate utilizes the plurality of guiding holes to movably connect with the plurality of guiding pillars. The movable measurement plate includes an opening portion and an indicating portion. The indicating portion is adjacent by the opening portion. The dimensional measurement component movably passes through the piercing hole, the dimensional measurement component has a first end and a second end opposite to each other, the first end protrudes from a surface of the lateral plate facing the accommodating space to touch the blade server, and the second end protrudes from the other surface of the lateral plate opposite to the accommodating space to partly reach out the opening portion.

The measurement fixture of the present invention can be applied to measure the appearance dimensions of any kind of blade servers, and the measurement fixture utilizes the isolating plate to define the subspace within the accommodating space for accommodating the blade servers with different standards. The blade server is fixed by the external fixing component, the first locking hole, the second locking hole, the positioning component and the latching component while the blade server is installed into the measurement fixture; in the meantime, the dimensional measurement component is partly pushed out of the opening portion of the movable measurement plate by the blade server. The user can visually observe the relation between a part of the dimensional measurement component reaching out the opening portion and those indicating surfaces of the indicating portion, or utilize the portable measuring component to measure the part of the dimensional measurement component reaching out the opening portion, and then determine whether the appearance dimensions of the blade server conform to the design standard.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
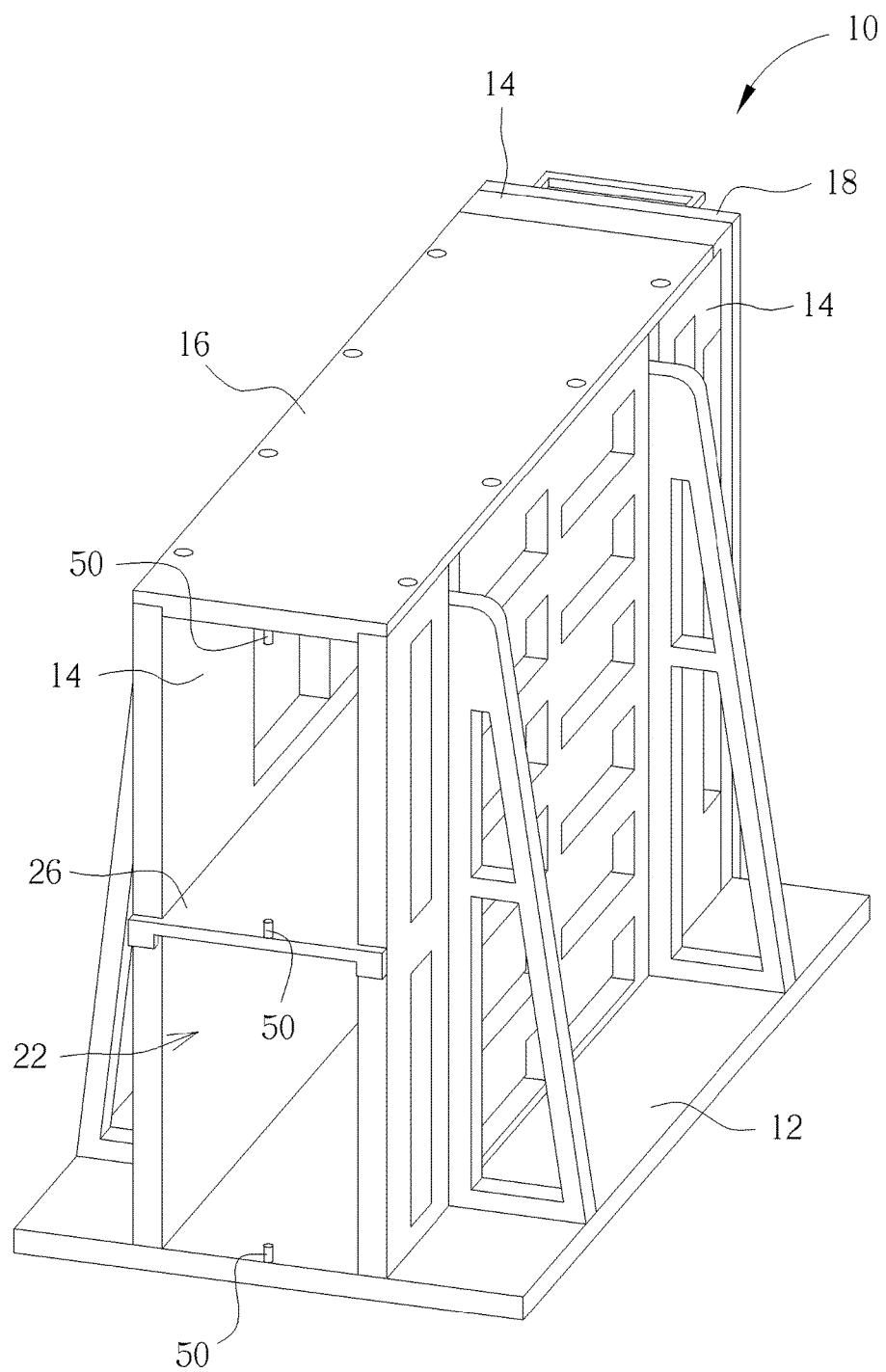
FIG. 1 and FIG. 2 respectively are diagrams of a measurement fixture in different views according to an embodiment of the present invention.
Figure 2:
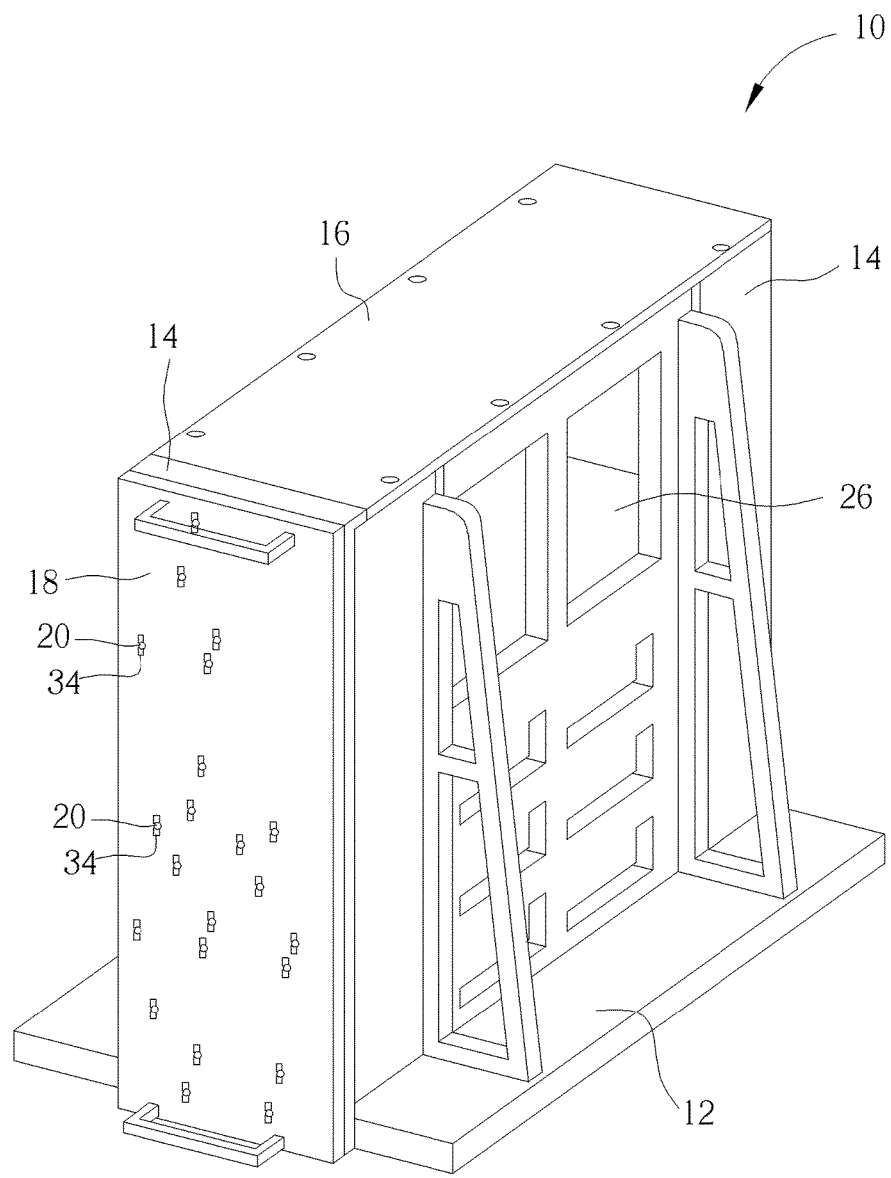
Figure 3:
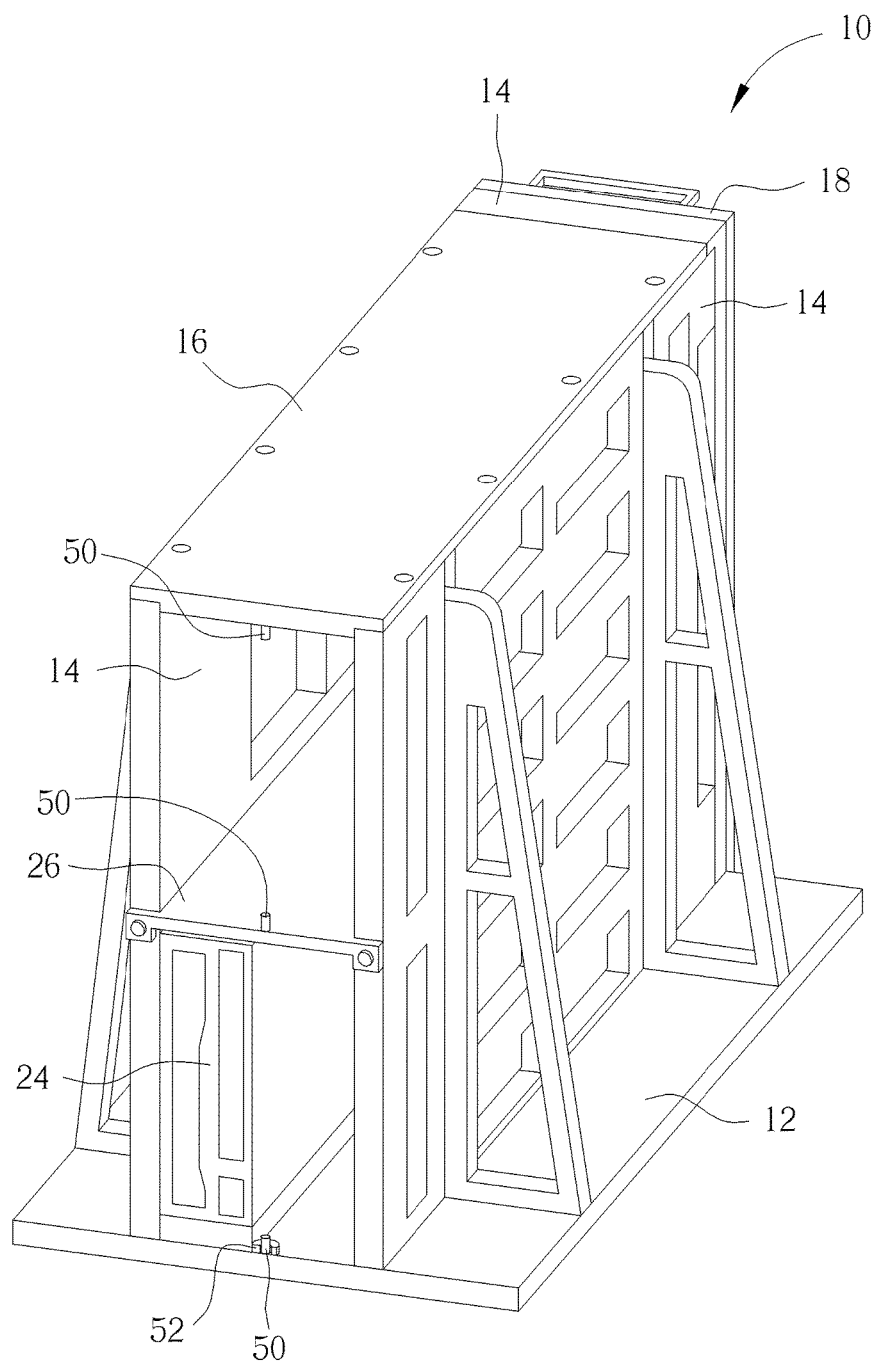
FIG. 3 is an assembly diagram of the measurement fixture and a blade server according to the embodiment of the present invention.
Figure 8:
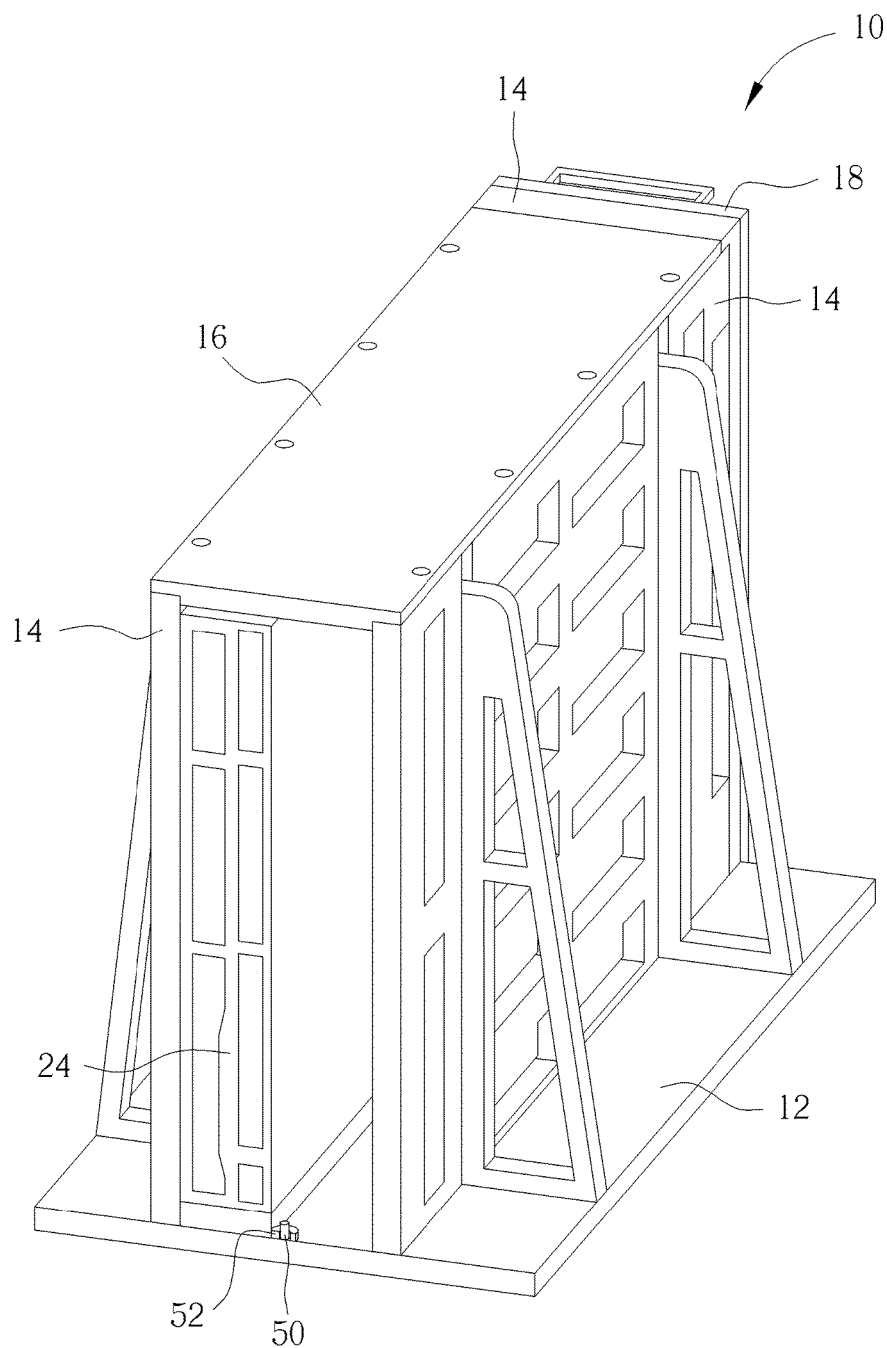
FIG. 8 and FIG. 9 respectively are assembly diagrams of the measurement fixture and the blade server with other dimension according to different embodiments of the present invention.
Figure 9:
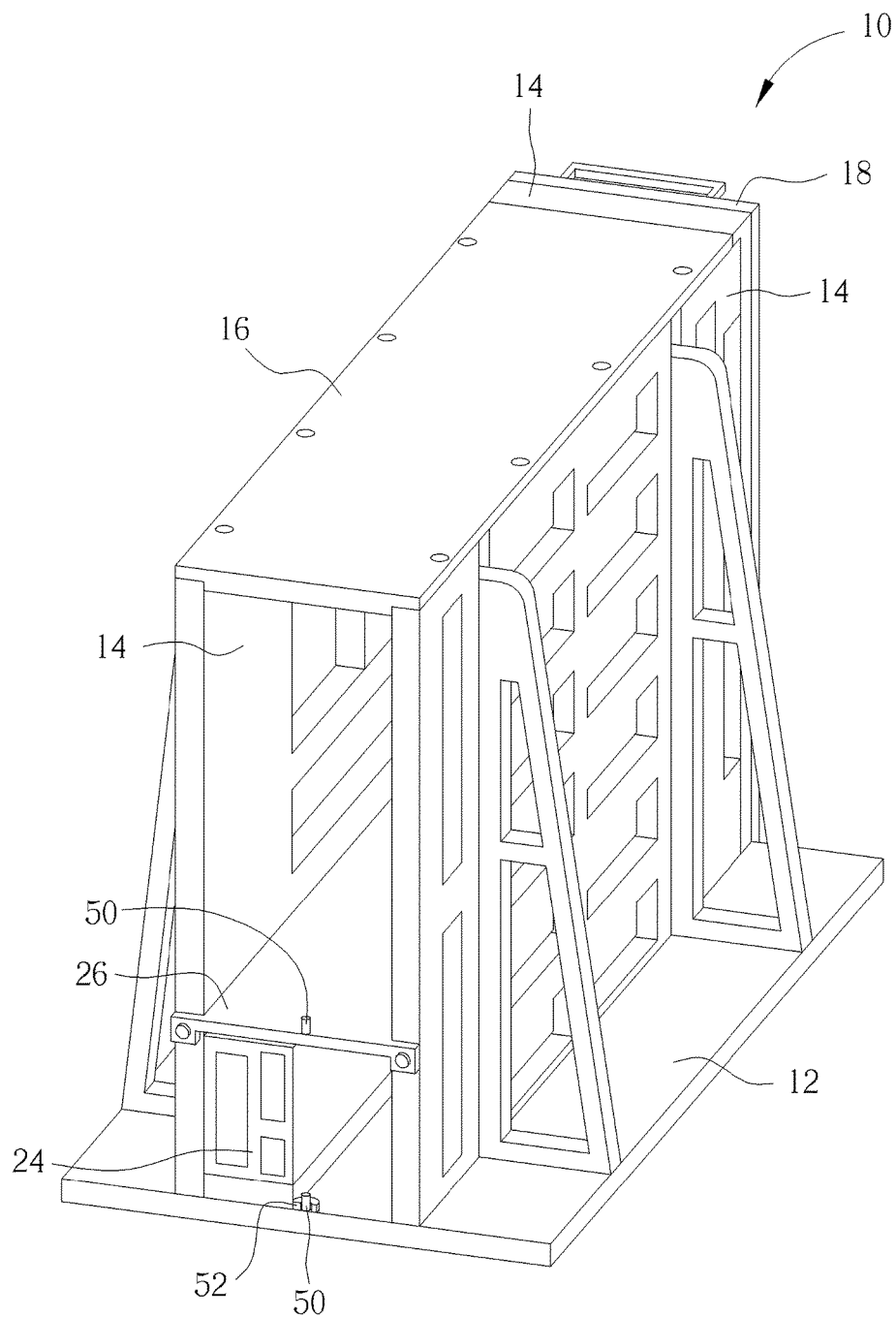

Please refer to FIG. 1, FIG. 3, FIG. 8 and FIG. 9. FIG. 1 and FIG. 2 respectively are diagrams of a measurement fixture 10 in different views according to an embodiment of the present invention. FIG. 3 is an assembly diagram of the measurement fixture 10 and a blade server 24 according to the embodiment of the present invention. FIG. 8 and FIG. 9 respectively are assembly diagrams of the measurement fixture 10 and the blade server 24 with other dimension according to different embodiments of the present invention. The measurement fixture 10 includes a base 12, a lateral plate 14, a top plate 16, a movable measurement plate 18 and a dimensional measurement component 20. The lateral plate 14 stands upon the base 12. The top plate 16 is disposed on an edge of the lateral plate 14 opposite to the base 12. An accommodating space 22 is formed between the base 12, the lateral plate 14 and the top plate 16 to accommodate the blade server 24. An isolating plate 26 of the measurement fixture 10 can be optionally disposed inside the accommodating space 22, the accommodating space 22 is divided into several subspace, and the said several subspace can be utilized to accommodate the blade server 24 with different dimensions.

As shown in FIG. 1 and FIG. 3, the measurement fixture 10 is utilized to measure the half-height blade server 24, and the isolating plate 26 is transversely disposed on a middle of the accommodating space 22; as shown in FIG. 8, while the isolating plate 26 is removed from the accommodating space 22, the measurement fixture 10 can be used to measure the full-height blade server 24 with a structural height similar to a height of the lateral plate 14. As shown in FIG. 9, the isolating plate 26 is transversely disposed on a lower middle position of the accommodating space 22, and the measurement fixture 10 can be utilized to measure the blade server 24 with the structural height similar to a quarter-height of the lateral plate 14. Accordingly, the isolating plate 26 can be vertically disposed inside the accommodating space 22 to constrain a structural width of the blade server 24.

A plurality of electronic components (such as connectors) with different dimensions can be disposed on a rear end of the blade server 24, a front end of the blade server 24 is assembled with the measurement fixture 10 by connection between a latching component 52 and a positioning component 50, and the measurement fixture 10 can measure a distance from the latching component 52 disposed on the front end of the blade server 24 to the connector disposed on the rear end of the blade server 24, and/or a distance from the latching component 52 disposed on the front end of the blade server 24 to the rear end of the blade server 24, which means the latching component 52 is a reference plane during measurement of the blade server 24. The measurement fixture 10 can be applied to determine protruding size of each connector reaching out the rear end of the blade server 24, so as to ensure that whether the blade server 24 conforms to design standard.

Figure 4:
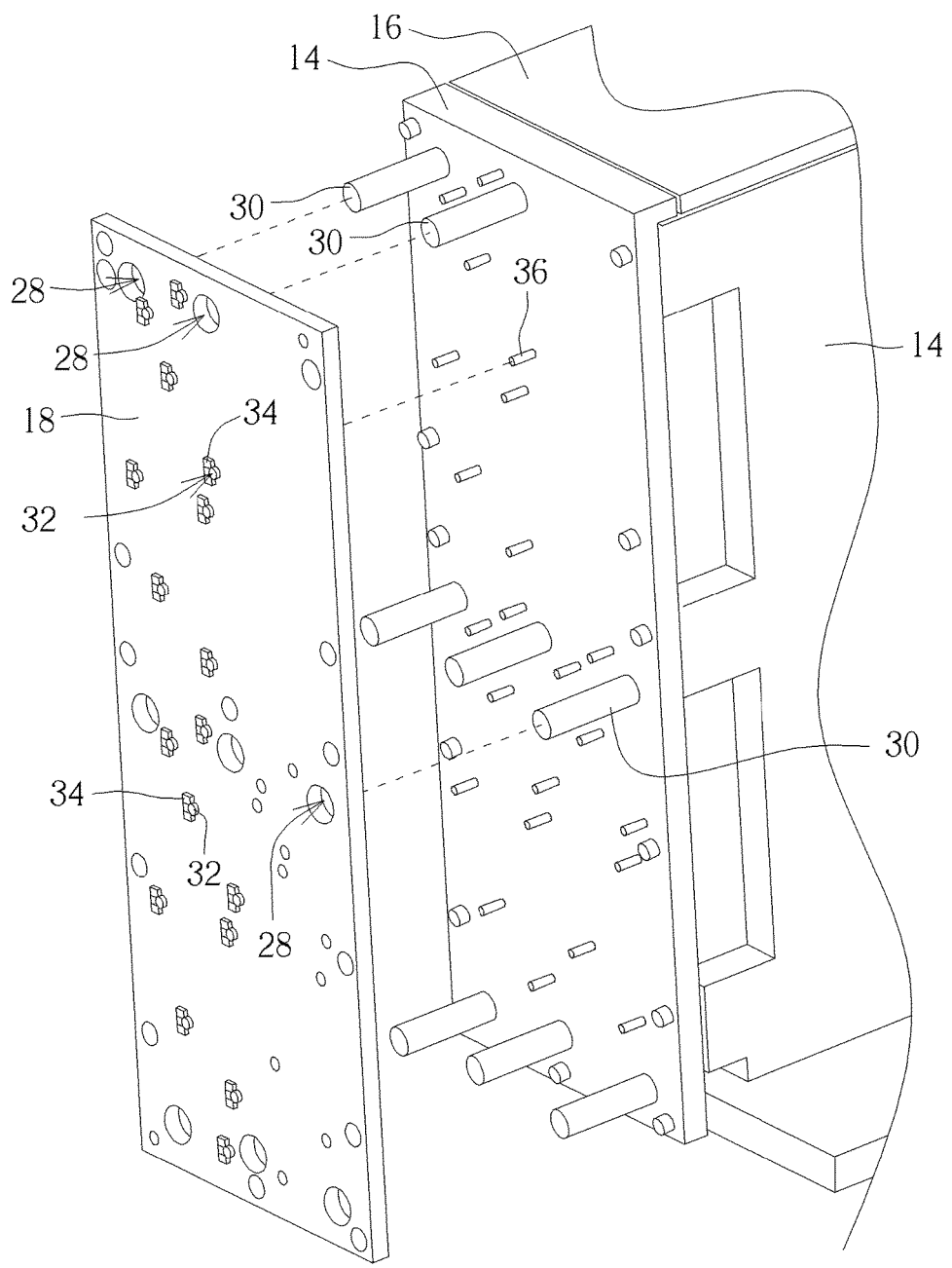
FIG. 4 is a diagram of a movable measurement plate separated from the lateral plate 14 according to the embodiment of the present invention.

The movable measurement plate 18 of the measurement fixture 10 utilizes a guiding hole 28 movably connect with a guiding pillar 30 disposed on the lateral plate 14, and the movable measurement plate 18 can move relative to the lateral plate 14 at an axial direction of the guiding pillar 30. The measurement fixture 10 has a plurality of guiding pillars 30 disposed on different positions on the lateral plate 14, for example, the plurality of guiding pillars 30 is preferably disposed on an upper region and a lower region of the lateral plate 14 in a symmetrical arrangement. As shown in FIG. 4, the guiding pillars 30 are preferably disposed on the lateral plate 14 in a transverse arrangement and in a vertical arrangement shown in figure. A plurality of guiding hole 28 is symmetrically disposed on the movable measurement plate 18 in a vertical arrangement, and aligns with the plurality of guiding pillar 30. Therefore, the plurality of guiding holes 28 on the movable measurement plate 18 respectively can be assembled with the plurality of guiding pillars of the lateral plate 14, to avoid rotation of the movable measurement plate 18 relative to the lateral plate 14. The movable measurement plate 18 has an opening portion 32 and an indicating portion 34. The opening portion 32 is set on a predetermined position and corresponds to position of the electronic component of the blade server 24. The indicating portion 34 is disposed adjacent by the opening portion 32.

Figure 5:
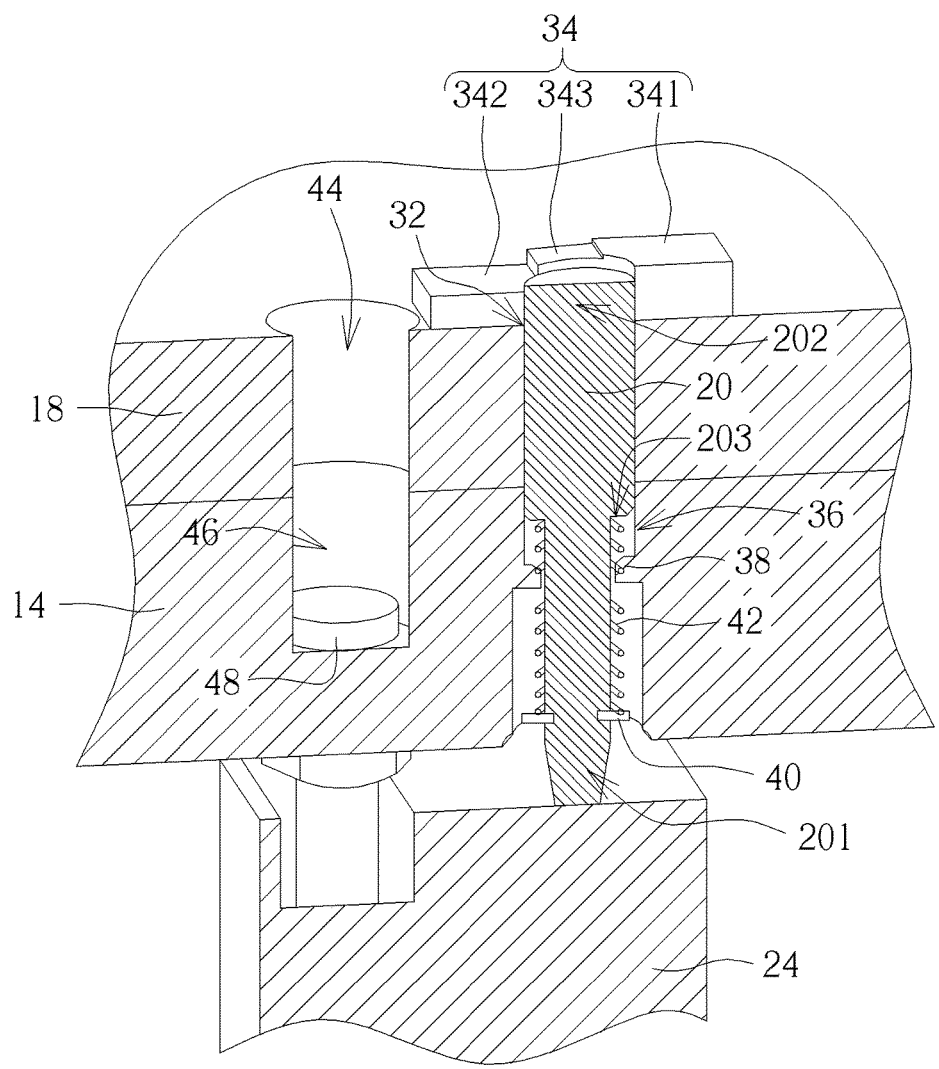
FIG. 5 is a partial diagram of the movable measurement plate and a lateral plate according to the embodiment of the present invention.

Please refer to FIG. 4 and FIG. 5. FIG. 4 is a diagram of the movable measurement plate 18 separated from the lateral plate 14 according to the embodiment of the present invention. FIG. 5 is a partial diagram of the movable measurement plate 18 and the lateral plate 14 according to the embodiment of the present invention. The dimensional measurement component 20 movably passes through the piercing hole 36 on the lateral plate 14. A first end 201 of the dimensional measurement component 20 protrudes from a surface of the lateral plate 14 facing the accommodating space 22 to contact against the blade server 24. A second end 202 of the dimensional measurement component 20 protrudes from other surface of the lateral plate 14 opposite to the accommodating space 22, and the second end 202 is able to partly reach out the opening portion 32.

A first contacting portion 38 is disposed on an inner wall of the piercing hole 36 and configured to contact against a contacting surface 203 of the dimensional measurement component 20, so as to constrain a movement of the dimensional measurement component 20 relative to the piercing hole 36. A second contacting portion 40 is disposed on the inner wall of the piercing hole 36, the measurement fixture 10 has a resilient component 42 disposed on the dimensional measurement component 20, and two ends of the resilient component 42 are respectively connected to the second contacting portion 40 and the dimensional measurement component 20. The resilient component 42 provides a resilient recovering force to move the dimensional measurement component 20 inside the piercing hole 36. Moreover, a first locking hole 44 is formed on the movable measurement plate 18 and a second locking hole 46 is formed on the lateral plate 14. An external fixing component 48 is applied to pass through the first locking hole 44 and the second locking hole 46, to lock the blade server 24 inside the accommodating space 22.

Figure 6:
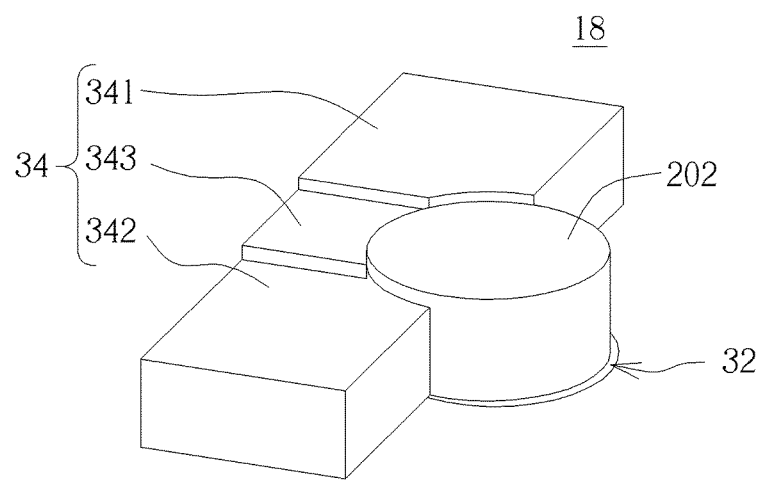
FIG. 6 is a partial diagram of the movable measurement plate according to the embodiment of the present invention.

Please refer to FIG. 6. FIG. 6 is a partial diagram of the movable measurement plate 18 according to the embodiment of the present invention. The indicating portion 34 mainly includes a first indicating surface 341, a second indicating surface 342 and a third indicating surface 343. The first indicating surface 341 has maximal structural height, which represents maximum of tolerant dimension; the second indicating surface 342 has minimal structural height, which represents minimum of tolerant dimension; the structural height of the third indicating surface 343 is set between structural heights of the first indicating surface 341 and the second indicating surface 342. While the first end 201 of the dimensional measurement component 20 contacts against the blade server 24, the second end 202 partly reaches out the opening portion 32, a relation between a protruding portion of the second end 202 and those indicating surfaces of the indicating portion 34 is visually observed by user to determine the dimension of the blade server 24.

For instance, while measuring the dimension of the blade server 24, the blade server 24 is installed into the accommodating space 22, the positioning component 50 of the base 12 and the positioning component 50 of the top plate 16 (which can be shown in FIG. 1 and FIG. 3) are respectively or simultaneously connected with the latching component 52 of the blade server 24 for positioning the blade server 24. The positioning component 50 is a reference plane of the measurement fixture 10 for measuring the dimensions of the blade server 24. The blade server 24 further may be assembled with the measurement fixture 10 by other latching unit (not shown in figures) for positioning. Meanwhile, the blade server 24 (or the specific electronic component) presses the first end 201 of the dimensional measurement component 20, the dimensional measurement component 20 is slightly shifted via the piercing hole 36; then, the movable measurement plate 18 is moved close to the lateral plate 14 by assembly of the guiding hole 28 and the guiding pillar 30, and the second end 202 of the dimensional measurement component 20 can partly reach out the piercing hole 36 and the opening portion 32. Final, the relation between the second end 202 and the indicating portion 34 is visually observed by the user, the dimensions of the blade server 24 is oversize while the second end 202 is higher than the first indicating surface 341, and the dimensions of the blade server 24 is not oversize while the second end 202 is lower than the first indicating surface 341.

Figure 7:
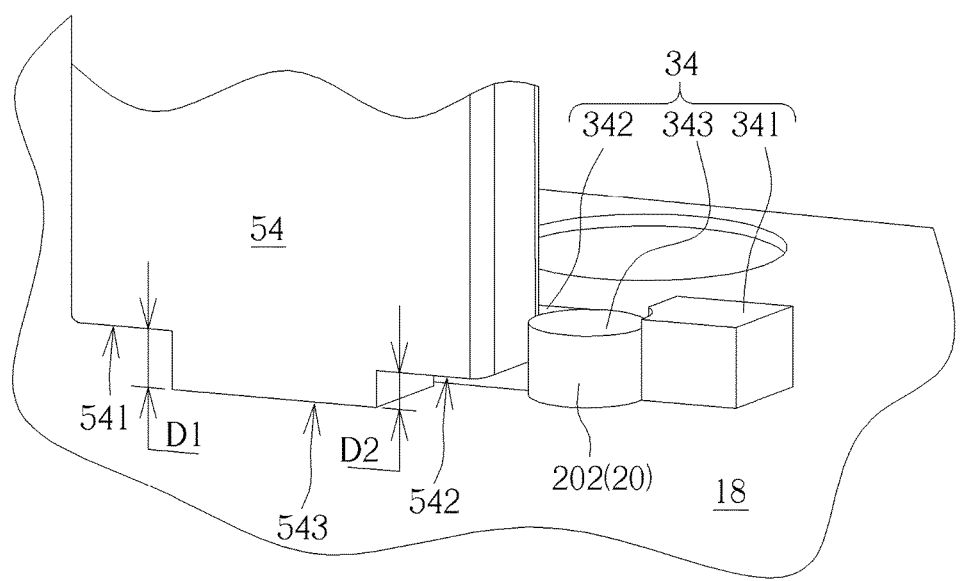
FIG. 7 is a partial diagram of the measurement fixture and a portable measuring component according to the embodiment of the present invention.

It should be mentioned that the measurement fixture 10 may optionally include a portable measuring component 54. Please refer to FIG. 7. FIG. 7 is a partial diagram of the measurement fixture 10 and the portable measuring component 54 according to the embodiment of the present invention. The portable measuring component 54 includes the first indicating surface 541 and the second indicating surface 542 with predetermined structural parameters, and a distance D1 between the first indicating surface 541 and an edge 543 of the portable measuring component 54 is greater than a distance D2 between the second indicating surface 542 and the edge 543. While the edge 543 abuts upon the movable measurement plate 18, the first indicating surface 541 or the second indicating surface 542 is moved toward the second end 202 of the dimensional measurement component 20. The dimensions of the blade server 24 is lower than the maximum of tolerant dimension while the first indicating surface 541 can move over the second end 202; the dimensions of the blade server 24 is greater than the minimum of tolerant dimension while the first indicating surface 541 cannot move over the second end 202, as shown in FIG. 7.

In conclusion, the measurement fixture of the present invention can be applied to measure the appearance dimensions of any kind of blade servers, and the measurement fixture utilizes the isolating plate to define the subspace within the accommodating space for accommodating the blade servers with different standards. The blade server is fixed by the external fixing component, the first locking hole, the second locking hole, the positioning component and the latching component while the blade server is installed into the measurement fixture; in the meantime, the dimensional measurement component is partly pushed out of the opening portion of the movable measurement plate by the blade server. The user can visually observe the relation between a part of the dimensional measurement component reaching out the opening portion and those indicating surfaces of the indicating portion, or utilize the portable measuring component to measure the part of the dimensional measurement component reaching out the opening portion, and then determine whether the appearance dimensions of the blade server conform to the design standard. Comparing to the prior art, the measurement fixture of the present invention has advantages of simple structural design, economical manufacturing cost and convenient measuring operation for the appearance dimensions of the blade server.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A measurement fixture for measuring dimensions of a blade server, comprising:
    a base;
    a lateral plate standing upon the base, a piercing hole being formed on the lateral plate, and a plurality of guiding pillars being disposed on the lateral plate;
    a top plate disposed on an edge of the lateral plate opposite to the base, an accommodating space being formed between the base, the lateral plate and the top plate and configured to accommodate the blade server;
    a movable measurement plate whereon a plurality of guiding holes is formed, the movable measurement plate utilizing the plurality of guiding holes to movably connect with the plurality of guiding pillars, the movable measurement plate comprising:
        an opening portion; and
        an indicating portion adjacent by the opening portion; and
    a dimensional measurement component movably passing through the piercing hole, the dimensional measurement component having a first end and a second end opposite to each other, the first end protruding from a surface of the lateral plate facing the accommodating space to touch the blade server, and the second end protruding from the other surface of the lateral plate opposite to the accommodating space to partly reach out the opening portion;
    wherein a structural dimension of the indicating portion is utilized to compare with a part of the second end reaching out the opening portion for determining the dimensions of the blade server.

2. The measurement fixture of claim 1, wherein the indicating portion at least comprises a first indicating surface and a second indicating surface, and a structural level difference is formed between the first indicating surface and the second indicating surface.

3. The measurement fixture of claim 2, wherein the indicating portion further comprises a third indicating surface, a structural level of the third indicating surface is located between structural levels of the first indicating surface and the second indicating surface.

4. The measurement fixture of claim 1, wherein a first contacting portion is disposed on an inner wall of the piercing hole and configured to contact against a contacting surface of the dimensional measurement component, so as to constrain a movement of the dimensional measurement component relative to the piercing hole.

5. The measurement fixture of claim 4, wherein the measurement fixture further comprises a resilient component, a second contacting portion is disposed on the inner wall, and two ends of the resilient component are respectively connected to the second contacting portion and the dimensional measurement component.

6. The measurement fixture of claim 1, wherein a first locking hole is formed on the movable measurement plate, a second locking hole is formed on the lateral plate, an external fixing component passes through the first locking hole and the second locking hole to lock with the blade server inside the accommodating space.

7. The measurement fixture of claim 1, further comprising:

a positioning component disposed on the base and configured to connect with a latching component of the blade server.

8. The measurement fixture of claim 1, further comprising:
a positioning component disposed on the top plate and configured to connect with a latching component of the blade server.

9. The measurement fixture of claim 1, wherein the plurality of guiding pillars is vertically disposed on an upper region and a lower region of the lateral plate in a symmetrical arrangement.

10. The measurement fixture of claim 9, wherein the plurality of guiding holes is vertically disposed on an upper region and a lower region of the movable measurement plate in a symmetrical arrangement, a symmetrical arrangement of the plurality of guiding holes aligns with a symmetrical arrangement of the plurality of guiding pillars.

\* \* \* \* \*